April 26, 1960  J. J. KILLINGER  2,934,356
MULTIPLE CONTROL ARRANGEMENT FOR AIR SPRING
Filed March 27, 1958  2 Sheets-Sheet 1

INVENTOR.
John J. Killinger
BY
W. S. Pettigrew
ATTORNEY

April 26, 1960 J. J. KILLINGER 2,934,356
MULTIPLE CONTROL ARRANGEMENT FOR AIR SPRING
Filed March 27, 1958 2 Sheets-Sheet 2

INVENTOR.
John J. Killinger
BY
W. S. Pettigrew
ATTORNEY

United States Patent Office 2,934,356
Patented Apr. 26, 1960

2,934,356
MULTIPLE CONTROL ARRANGEMENT FOR AIR SPRING

John J. Killinger, Pontiac, Mich., assignor to General Motors Corporation, Detroit, Mich., a corporation of Delaware Application March 27, 1958, Serial No. 724,343

8 Claims. (Cl. 280—124)

This invention relates to pneumatic suspension and more particularly, although not exclusively, to improvements in pneumatic suspension especially adapted for trucks and trailers.

One of the more significant advantages of pneumatic suspension as applied to motor trucks and tractors is the maintenance of constant ride height. In the case of tractors, it follows that the height of the "fifth wheel" will remain constant. Since the height of fifth wheels in conventionally suspended tractors varies according to load, a problem arises when coupling a pneumatically suspended tractor to a trailer which has previously been coupled to a leaf spring tractor.

An object of the present invention is to provide an improved air suspension system.

Another object is to provide an air suspension system for a truck tractor which allows the tractor to be connected to a trailer previously coupled to a leaf spring tractor.

A further object is to provide a pneumatic tractor suspension system including auxiliary control means effective to raise the suspended portion of the tractor to any of a plurality of levels above the normal design height.

A still further object is to provide a system of the stated character in which temporary increase in design height is accomplished by by-passing the air spring leveling valves which normally control the design height of the tractor.

Still a further object is to provide a system of the stated character wherein the by-passing means includes means for automatically disabling the operation of the leveling valves during the period in which the auxiliary control is in operation.

Yet another object is to provide a system of the stated character wherein a source of fluid pressure is connected to a fluid spring by means of first circuit having a height sensing leveling valve therein and a second circuit having a manually operated valve disposed therein, wherein the two circuits are connected together upstream of the respective valves for communication with the air spring via a single conduit, the common connection between the two circuits including a two-way check valve, the position of which is determined by differential pressure.

These and other objects, advantages and features of the invention will become more fully apparent as reference is had to the accompanying specification and drawings wherein.

Figure 1:
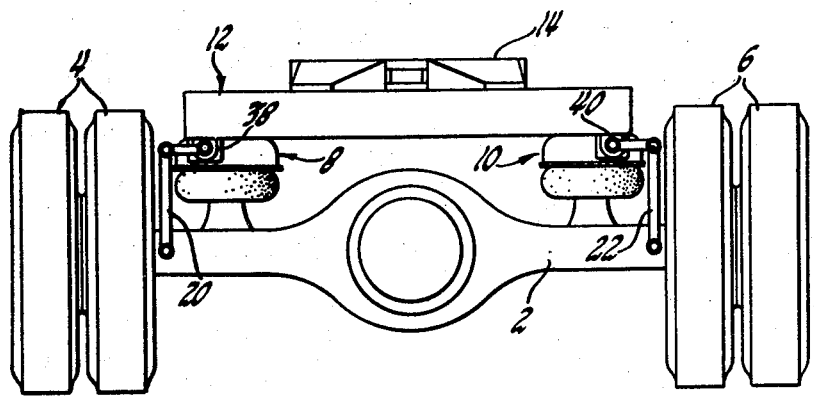
Fig. 1 is an end elevational view of a rear axle suspension and associated fifth wheel of a typical truck tractor.
Figure 2:
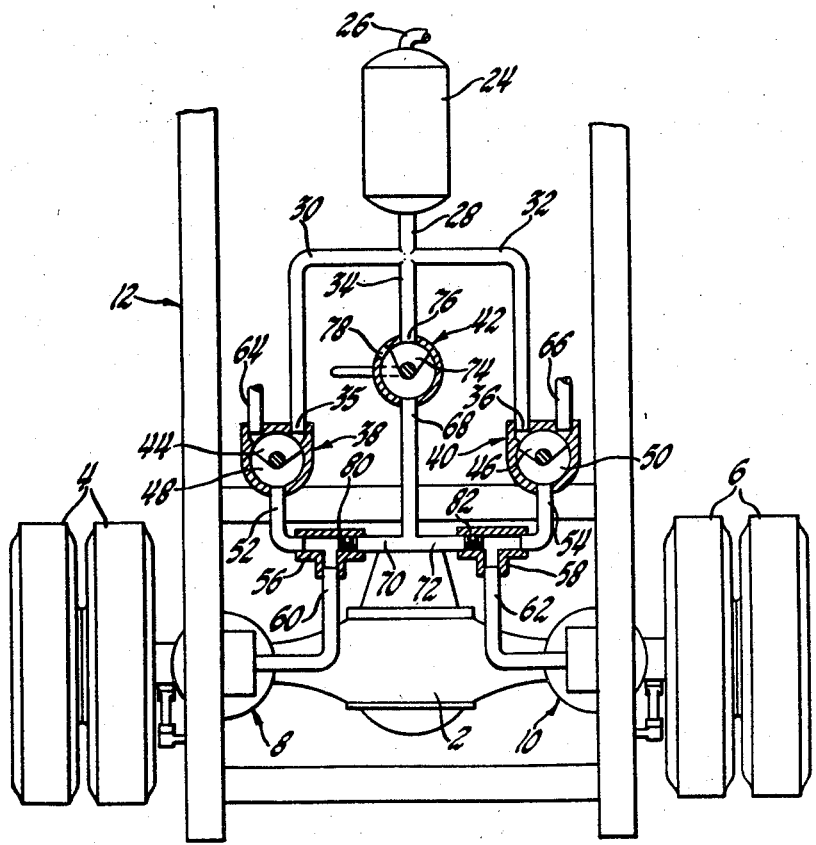
Fig. 2 is a fragmentary plan view of the tractor structure shown in Fig. 1 including a diagrammatic showing of an air distribution system according to the present invention, the various parts being shown in the relative positions occupied during normal operation of the vehicle.

Referring now to the drawings and particularly Figs. 1 and 2, there is shown the rear portion of a tractor in which the reference numeral 2 designates generally a rigid rear axle disposed transversely of the vehicle. Rotatably supported at opposite ends of axle 2 are the usual dual wheel assemblies 4 and 6. Disposed above axle 2 and supported by pneumatic spring assemblies 8 and 10, is the tractor frame 12 upon which is mounted a fifth wheel table 14 which is adapted for engagement with a mating structure associated with a trailer, not shown. Fifth wheel table 14 is normally maintained at a constant design height by operation of rear spring leveling valves 38 and 40 which introduce and exhaust air to and from springs 8 and 10 in response to actuation of linkages 20 and 22. For the purposes of clarity, leveling valves 38 and 40 of Fig. 1 are shown diagrammatically in Fig. 2.

Referring now to Fig. 2, reference numeral 24 designates a high pressure tank which receives compressed air via conduit 26 from an engine driven compressor, not shown. From tank 24, high pressure air is transmitted through conduit 28 which is connected in common communication with conduits 30, 32 and 34. Conduits 30 and 32, respectively, conduct high pressure air to the intake sides 35 and 36 of leveling valves 38 and 40, respectively, while conduit 34 conducts high pressure air to a manually controlled valve 42 which may be conveniently located in the driver's compartment of the vehicle. Each leveling valve 38 and 40 includes a rotatable closure member 44 and 46, the position of which is controlled by linkage 20 and 22, respectively. For the purposes of description, it will be assumed that reduction in vertical clearance between frame 12 and axle 2 will cause closure members 44 and 46 to rotate in a counterclockwise direction, causing the intake sides 35 and 36 to be placed in open communication with the interiors 48 and 50 of their respective leveling valves. High pressure air entering the interiors 48 and 50 passes out through conduits 52 and 54 which are connected respectively to T junctions 56 and 58. From T junctions 56 and 58, high pressure air is conducted through conduits 60 and 62 to the respective springs 8 and 10. Conversely, upon increase in vertical clearance between frame 12 and axle 2, closure members 44 and 46 of leveling valves 38 and 40 will be rotated in a clockwise direction to cause the interior of each valve to be placed in open communication with exhaust conduits 64 and 66, thereby allowing air to be discharged from the springs 8 and 10 to atmosphere. As a result of the operation of leveling valves 38 and 40, air is either introduced or exhausted from springs 8 and 10 until the closures 44 and 46 assume the position shown in Fig. 2 wherein both the intake and exhaust sides of the leveling valves are blocked from communication with the interior of the leveling valve.

Figure 3:
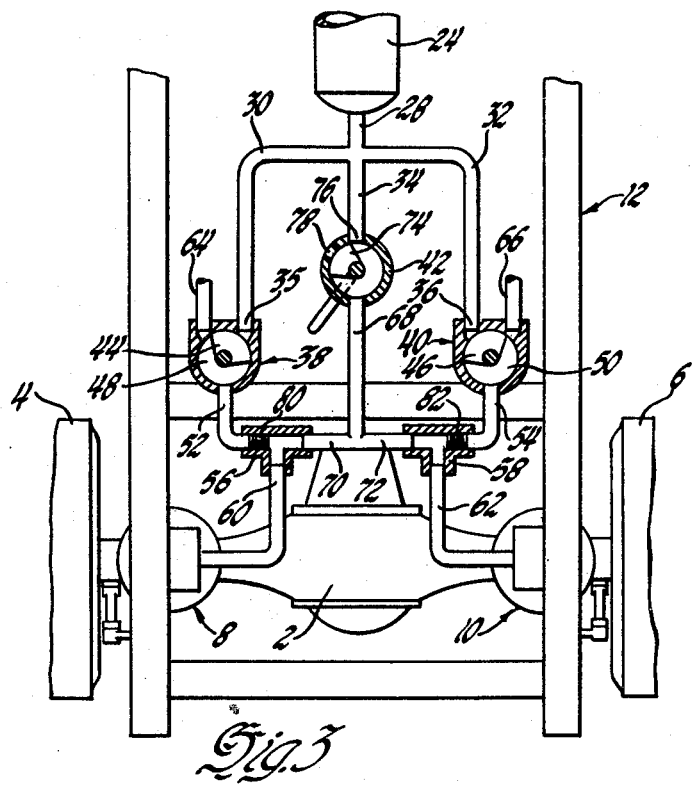
Fig. 3 is a view similar to Fig. 2 showing the relative position of the parts when it is desired to raise the fifth wheel above the normal trim height.

In order to accomplish temporary increase in vertical displacement of frame 12 and fifth wheel table 14 in accordance with the general features of the present invention, a conduit 68 extending from manual valve 42 is connected in common communication with both junction T's 56 and 58 via conduits 70 and 72. Referring now to Fig. 3, it will be seen that when closure 74 of manual valve 42 is rotated in counterclockwise direction to uncover port 76, high pressure air is allowed to pass through valve 42, conduit 68, 70, and 72 into each junction T 56 and 58 and thence to the springs 8 and 10. Since the pressure in high pressure tank 24 is normally greater than the internal spring pressure, the resulting increase in pressure in the springs causes the latter to expand and thereby raise the height of fifth wheel table 14 until engagement with the trailer, not shown, is effected. As soon as engagement is effected, the closure 74 is returned to the position shown in Fig. 2, opening a second port 78 in valve 42 allowing the air in the springs to exhaust to atmosphere and thus returning the sprung mass to the normal trim height determined by leveling valves 38 and 40.

Figure 4:
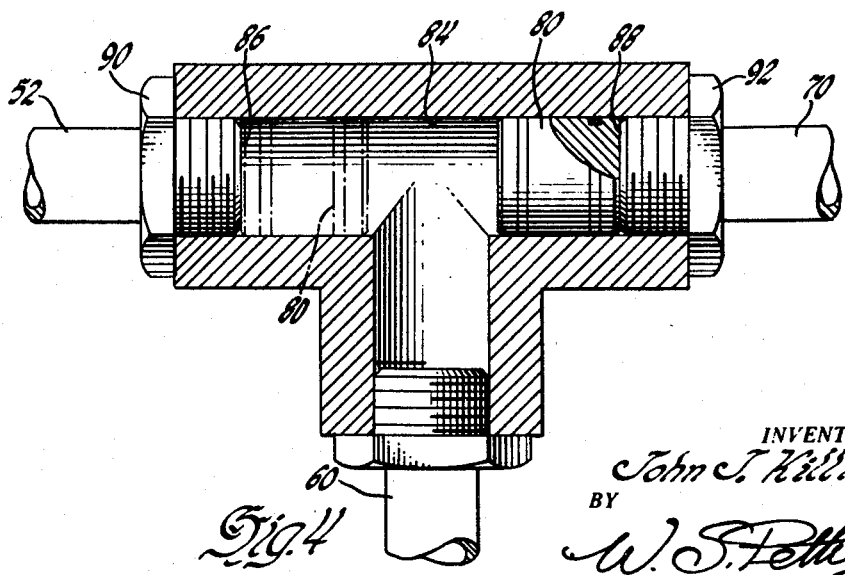
Fig. 4 is an enlarged fragmentary view, partly in section, showing the details of construction of the automatic pressure differential responsive valve associated with the invention.

In order to prevent complete loss of air from the springs 8 and 10 through port 78, in accordance with another feature of the invention junction T's 56 and 58 are provided with pressure differential check valve elements 80 and 82. As seen best in Fig. 4, element 80 is a free piston which is slidable in the transverse bore 84 between the inner faces 86 and 88 of couplings 90 and 92 associated with conduits 52 and 70, respectively. In operation, piston element 80 moves alternately from left or right to block air flow from spring 8 toward leveling valve 38 or to manual valve 42, respectively. By way of example, when manual valve 42 is in the closed position, with the system operating normally, piston 80 occupies the full right position shown in Fig. 4 due to the fact that the pressure on its left side is equal to spring pressure and is, therefore, greater than the pressure on its right side which is atmospheric pressure, owing to the open condition of port 78 in valve 42. However, when closure 74 is moved to the position shown in Fig. 3, port 78 is closed while port 76 is open. Therefore, the pressure on the right side of piston 80 is equal to the high pressure tank pressure which is normally higher than spring pressure. As a result, piston 80 is forced to the left side of T junction 56. Consequently, even though closure members 44 and 46 of the leveling valves have uncovered the exhaust sides 92 and 94 thereof, owing to the increased inflation of springs 8 and 10, air in the springs is prevented from flowing to atmosphere through exhaust conduits 64 and 66 by the blocking action of pistons 80 and 82. When closure 74 is returned to normal position, air exhausts to atmosphere through port 78 until the closures 44 and 46 uncover the intake side of leveling valves 38 and 40 whereupon high pressure air from tank 24 forces pistons 80 and 82 to return to their normal position blocking further exit of air from the springs to atmosphere through port 78. Thereafter, the system returns to normal operation wherein the trim height of the sprung portion of the vehicle is controlled exclusively by leveling valves 38 and 40.

In order to increase the flexibility of operation of the device, manual valve closure 74 may be so formed that it will simultaneously block intake port 76 and exhaust port 78 of valve 42 when placed in an intermediate position. In this way, the operator may temporarily raise the sprung portion of the vehicle by first moving closure 74 counterclockwise to the position shown in Fig. 3 until the sprung portion of the vehicle has reached some desired extended height and then moving the closure clockwise to an intermediate position to maintain the desired height for any desired duration. Further clockwise return movement of the closure to the position shown in Fig. 2 will of course open port 78 and result in return of the sprung mass to the normal trim height in the manner previously described.

While but one embodiment of the invention has been shown and described, it is apparent that other changes and modifications may be made therein. It is, therefore, to be understood that it is not intended to limit the invention to the embodiment shown, but only by the scope of the claims which follow.

I claim:

1. In a vehicle, a fluid suspension system comprising, a plurality of expansible springs disposed between the sprung and unsprung mass of the vehicle, leveling valves controlling inflation and deflation of said springs, height sensing means for operating said valves, a manually operated valve for inflating said springs independently of said leveling valves, and system pressure responsive means effective upon operation of said manual valve to disable fluid flow from said springs to said leveling valves.

2. The structure set forth in claim 1 wherein said pressure responsive means comprises a free piston slide valve.

3. In a fluid suspension system for vehicles, a plurality of expansible springs disposed between the sprung and unsprung mass of the vehicle, leveling valves controlling inflation and deflation of said springs, height sensing means for operating said valves, a manually operated valve having a first position for inflating said springs independently of said leveling valves and a second position for deflating said springs independently of said leveling valves, and fluid pressure responsive means effective to prevent fluid flow from said springs to said leveling valves when said manual valve is in said first position and to prevent fluid flow from said springs to said manual valve when the latter is in said second position.

4. In a vehicle suspension including a plurality of expansible springs disposed between the sprung and unsprung mass, a fluid distribution system comprising a leveling valve for each of said springs controlling inflation and deflation thereof, height sensing means for operating said valves, a manually operated valve for inflating said springs independently of said leveling valves, and a pressure differential operated valve effective in one position to disable flow between said springs and said leveling valves and in another position to disable flow between said springs and said manually operated valve.

5. In a motor vehicle suspension, the combination of a source of air under pressure, an air spring disposed between the sprung and unsprung mass of the vehicle, a pair of conduits connected in parallel to said source, a junction connecting said conduits, a third conduit connecting said junction with said spring, a height sensing leveling valve interposed in one conduit of said pair of conduits, a manually operated valve interposed in the other conduit of said pair of conduits, and a slide valve disposed in said junction, said slide valve being movable to alternate positions blocking flow from said spring to said leveling valve or said manual valve, respectively, responsive to pressure differential in the portions of said pair of conduits downstream of said leveling valve and manually operated valve.

6. The structure set forth in claim 5 wherein said manually operated valve is movable to a first position placing said junction in communication with said source of pressure, and a second position placing said junction in communication with atmosphere.

7. The structure set forth in claim 6 wherein movement of said valve to said first position blocks communication with atmosphere and movement of said valve to said second position blocks communication with said source of pressure.

8. The structure set forth in claim 7 wherein said valve is formed so as to block communication with both atmosphere and said source of pressure when moved to a position intermediate said first and second positions.

References Cited in the file of this patent

UNITED STATES PATENTS

| | | |
|---|---|---|
| 1,410,289 | Farmer | Mar. 21, 1922 |
| 1,641,640 | Myers | Sept. 6, 1927 |
| 2,618,243 | Treganowan | Nov. 18, 1952 |
| 2,762,633 | Gouirand | Sept. 11, 1956 |